April 8, 1930.  J. W. GREER ET AL  1,753,828
CONFECTIONERY COOLING TUNNEL
Filed June 28, 1927   3 Sheets-Sheet 1
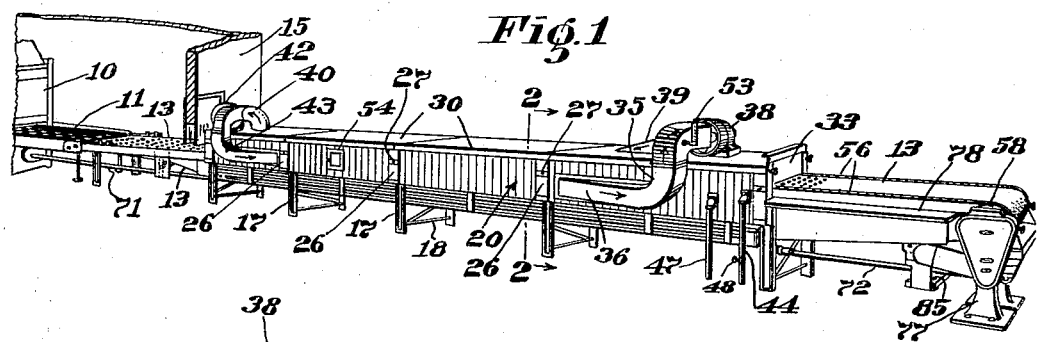
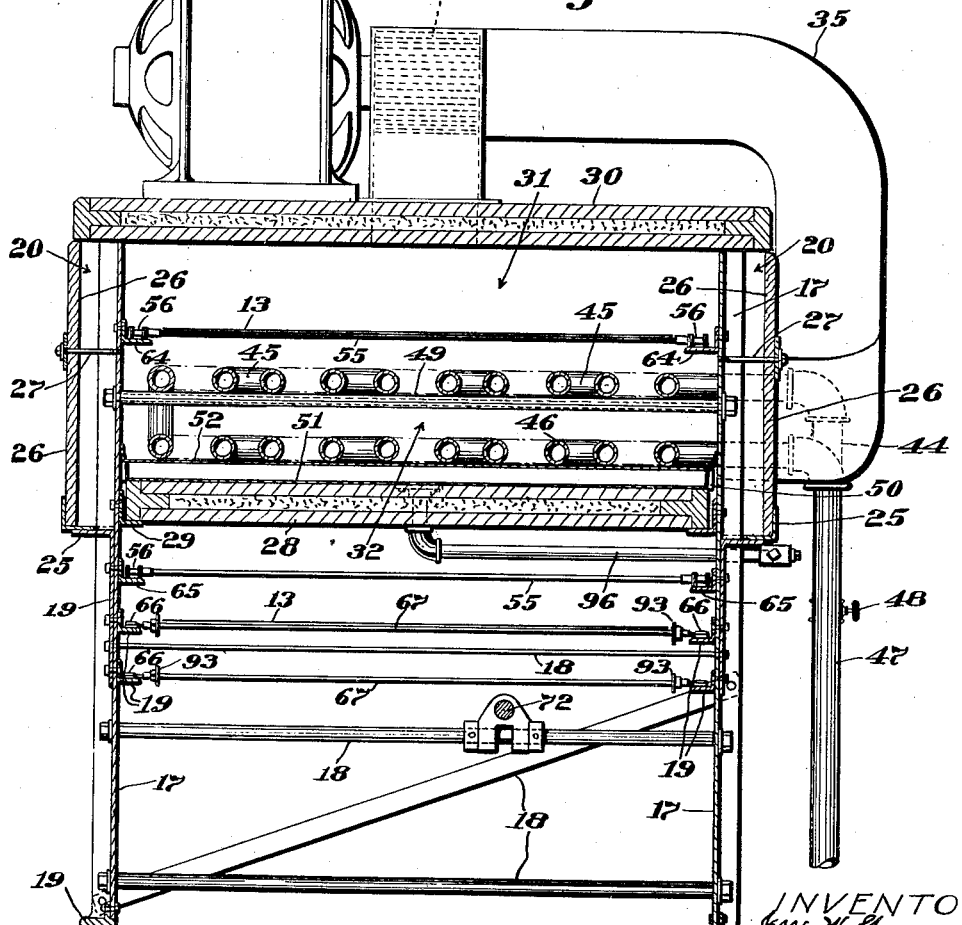

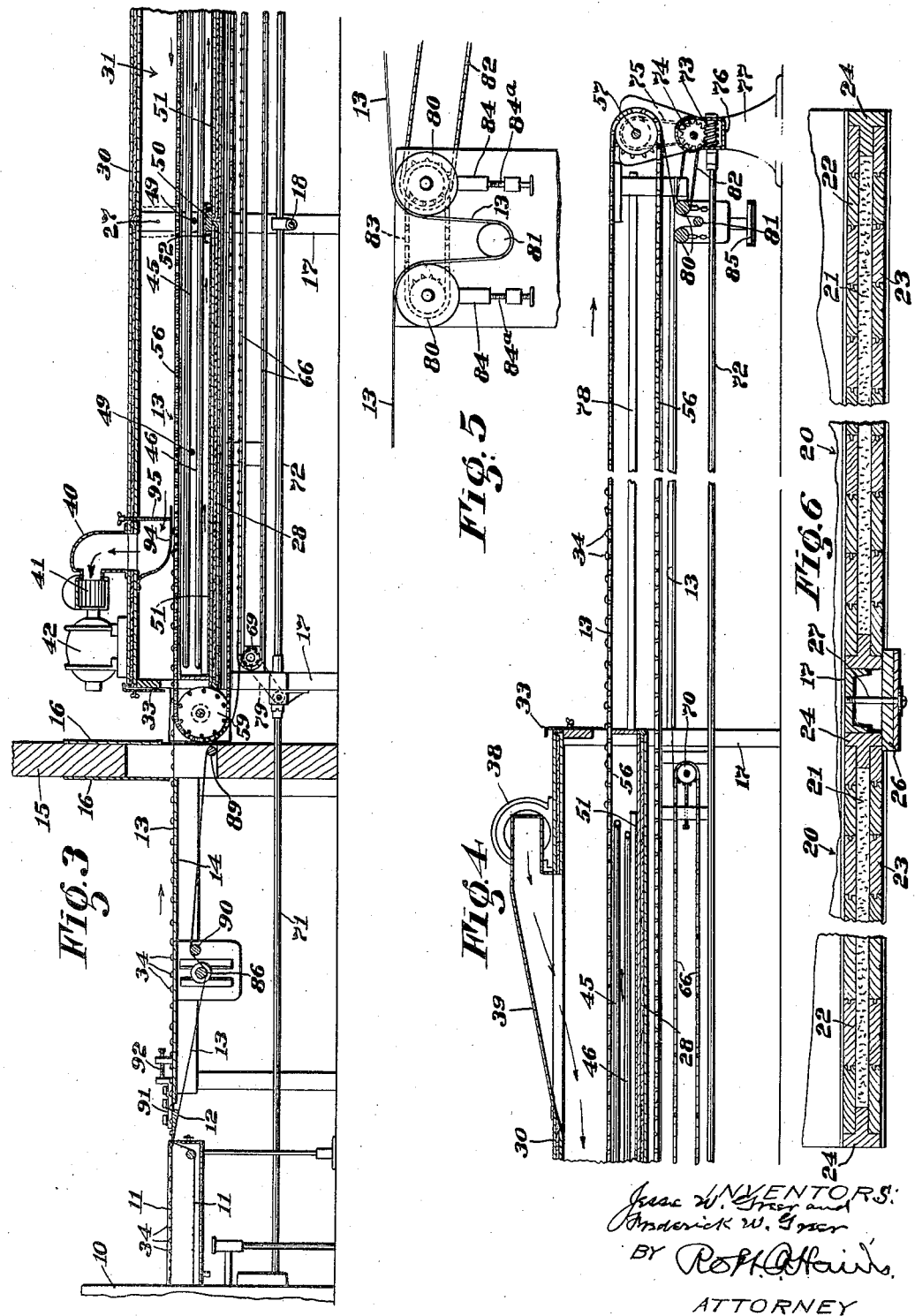

April 8, 1930.  J. W. GREER ET AL  1,753,828
CONFECTIONERY COOLING TUNNEL
Filed June 28, 1927  3 Sheets-Sheet 3
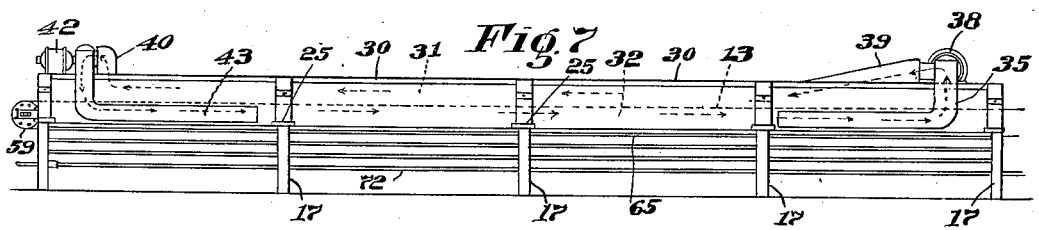
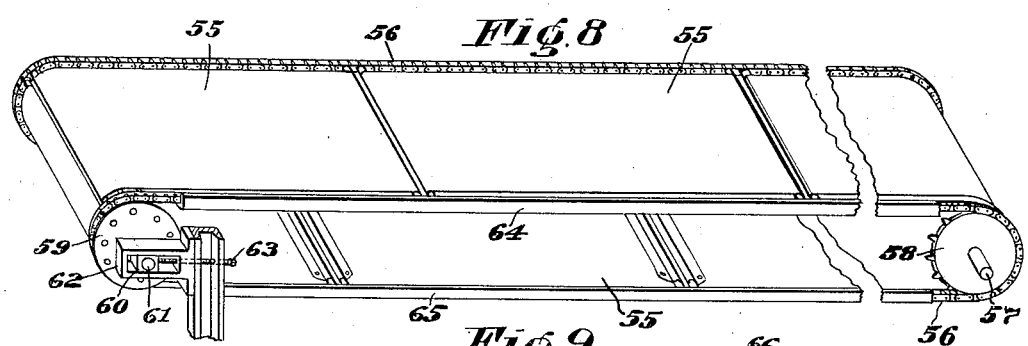
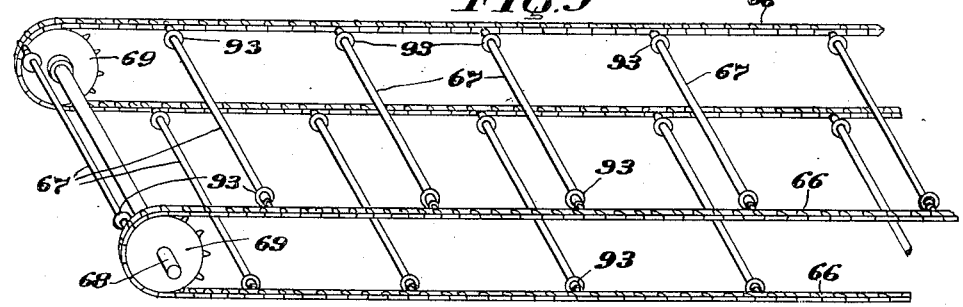
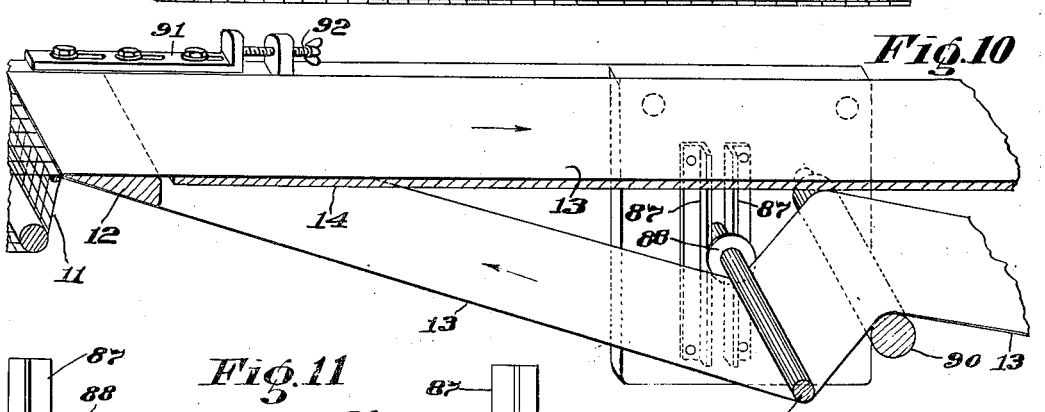
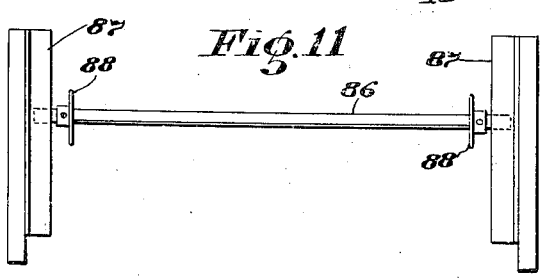

Patented Apr. 8, 1930

1,753,828

UNITED STATES PATENT OFFICE

JESSE W. GREER AND FREDERICK W. GREER, OF CAMBRIDGE, MASSACHUSETTS

CONFECTIONERY-COOLING TUNNEL

Application filed June 28, 1927. Serial No. 202,149.

This invention relates to cooling tunnels such as are employed to cool the chocolate coating upon candy and other confections.

In manufacturing chocolate coated candy and cakes, the goods to be coated are passed through a coating machine where hot chocolate is sprayed upon the goods. They are then conveyed through a cooling chamber for a sufficient length of time to permit the coating to cool and harden, so that the confections may be handled and packed.

The speed at which the coated confections may be advanced through the cooling chamber depends upon the length of the tunnel and its cooling properties. Much difficulty has been experienced heretofore in developing a good practical construction that will cool the hot chocolate quickly, and it is apparent that any improvement in the construction of the cooling tunnel whereby the time required for cooling the confections is reduced, permits the use of a shorter tunnel or a higher speed in advancing the confections through the tunnel.

It has been proposed heretofore to place refrigerating coils in the tunnel above the goods being conveyed through the tunnel, so that the cold air will settle upon the goods, but the circulation of air produced by this construction is not rapid enough, and it is very difficult to prevent the moisture of condensation that collects on the refrigerating pipes from dripping down onto the conveyor apron and spoiling it.

An important feature of the present invention therefore resides in a cooling tunnel having refrigerating coils placed below the goods instead of above them as heretofore, with the result that all danger of moisture dropping onto the conveyor apron is avoided, and a free unobstructed chamber is provided above the goods that is easy to keep clean and which permits ready access to any portion of the conveyor apron within the tunnel.

Another important feature of the invention resides in the construction whereby the tunnel is divided longitudinally by the conveyor apron into an upper and a lower air passage, and in means for forcing air through the upper and lower passage in a closed circuit. As a result of this construction dry air from which the moisture has been removed by condensation upon the refrigerating coils is used over and over again, and in this way moisture is excluded from the upper chamber through which the confections are conveyed. Furthermore, the cold air in the lower chamber helps to chill the conveyor apron, with the result that the lower faces of the confections resting upon the apron are rapidly chilled to prevent the chocolate at the bottom of the confections from spreading out and forming "feet."

It has been proposed heretofore to place the freshly coated confections on an "enameled" apron formed of glazed paper or of a thin woven fabric having a glazed surface which will prevent the confections from adhering thereto, but difficulty has been experienced in driving these long enamel aprons without tearing the same. Canvas belts have been employed heretofore to support and advance the enamel aprons but these belts give much trouble due to their tendency to run crooked.

These difficulties are entirely overcome by the construction of the present invention, and a further feature of the invention resides in an endless sheet metal belt employed to convey the enamel apron through the tunnel. The belt is formed of flexible sheet metal sections that are attached to spaced side chains, the construction being such that all tendency of the conveyor belt to work sidewise is avoided and this prevents the loaded enamel apron from working sidewise while passing through the tunnel.

Still another feature of the invention resides in a traveling conveyor positioned to support and advance the lower run of the enamel apron to thereby relieve this lower run from injurious dragging forces, and a further feature of the invention resides in a floating guide roll for the lower run of the enamel apron.

Other features of the invention and novel combination of parts in addition to the above will be hereinafter described in connection with the accompanying drawings which illustrate one good practical form of the invention.

In the drawings:—

Fig. 1 is a perspective view of a confectionery cooling tunnel constructed in accordance with the present invention and shown in position to receive coated confections from the coating machine;

Fig. 2 on an enlarged scale is a transverse sectional view on the line 2—2 of Fig. 1;

Fig. 3 on a somewhat enlarged scale is a vertical sectional view through the material receiving portion of the tunnel of Fig. 1;

Fig. 4 is a similar view showing the discharge portion of the tunnel of Fig. 1;

Fig. 5 is a side view of apron tensioning and driving means for the lower run of the conveyor apron;

Fig. 6 is a horizontal sectional view through a portion of the side wall of the tunnel;

Fig. 7 is a diagrammatic side view of the tunnel showing the direction in which the air travels in the upper and lower passages of the tunnel;

Fig. 8 is a perspective view of a sectional sheet metal belt which supports the upper run of the conveyor apron;

Fig. 9 is a perspective view of conveying mechanism employed to support and advance the lower run of the conveyor apron;

Fig. 10 is a perspective view of guide means located near the left-hand end of the conveyor apron; and Fig. 11 is a side view of the floating guide roller shown in Fig. 10.

The candy or other confections which have been coated in a coating machine 10 are conveyed therefrom by a wire apron 11 in a well known manner, and adjacent the discharge end of the upper run of the apron 11 is positioned a knife-blade-guide-bar 12 about which the conveyor-apron 13 passes and upon which apron the coated confections are deposited to be conveyed through the cooling tunnel forming the subject matter of the present invention.

It is frequently desirable to advance the coated confections along a table 14 before they enter the cooling tunnel in order that the confections may be ornamented by girls standing or seated along the table 14. This table may be located in a room which is separated by a wall 15 from the room containing the cooling tunnel, this being desirable as the temperature of the room containing the cooling tunnel may be considerably lower than the temperature of the room containing the coating machine and table 14. One or more sliding gates 16 may be provided to vary the size of the opening in the wall 15 through which the conveyor apron 13 passes.

The cooling tunnels now in use vary considerably in length and may range from say 30 to 100 feet. It is therefore desirable to construct the tunnel in sections so that the length of the tunnel may be increased or decreased to meet the particular needs of a manufacturer. In the construction shown the tunnel is provided with a supporting frame consisting of the uprights 17 which are spaced an equal distance apart lengthwise of the tunnel and are connected by transversely extending braces 18, and to the uprights 17 are secured the longitudinally extending bars or angle rods 19 which serve to strengthen the frame and also to help support the guideways along which the upper and lower runs of the conveyor belts travel, as will be hereinafter more fully pointed out. Between each pair of uprights 17 are mounted the wall sections 20, each of which is formed of insulating material and as shown in Fig. 6 consists of a sheet of cork 21 which is confined between an inner wall 22 formed of tongue and grooved boards and an outer wall 23 which is similarly formed. The marginal edges of the sectional walls 20 are preferably protected by the surrounding frame 24, the arrangement being such that each section 20 is complete in itself and may be readily secured in place between a pair of spaced uprights 17. These side wall sections 20 may be supported in the tunnel forming position by angle irons 25 extending lengthwise of the tunnel, as best shown in Fig. 2, and the sections 20 may be secured in place by the vertically disposed clamping boards 26 which are secured to the uprights 17 by bolts 27. The clamping boards 26 overlap the ends of the sections 20, as will be apparent from Fig. 6. The floor or bottom of the cooling tunnel may be similarly formed of insulated sections 28 the marginal side edges of which rest upon the angle irons 29 that are secured to the inner face of the uprights 17. The top or upper wall of the cooling tunnel is formed of insulated sections 30 which rest upon the side walls 20, and leakage of air between the adjacent ends of the top sections 30 and under the marginal edges of the top sections may be prevented by the insertion of felt strips at these points. It will be apparent from the construction of the tunnel just described that the same constitutes a practically air-tight chamber which is well insulated from the air of the atmosphere, and that the upper and side sections of the same may be readily removed to inspect or clean the interior of the tunnel, or make repairs.

The construction of the cooling tunnel is such that the confectionary carrying apron 13 and belt for supporting the same constitute a partition which separates the cooling tunnel into an upper air passage 31 and lower air passage 32, the arrangement being such that the conveyor apron 13 and confections resting thereupon are subjected to the cooling action of the air in both the upper and lower passages. The tunnel is closed to the atmosphere as far as practical by sliding gates 33 positioned at the opposite ends of the tunnel above the apron 13 and which may be adjusted so that their lower edges will just clear the confections 34 resting upon the apron 13.

The air within the cooling chamber is caused to travel in an endless circuit through the upper and lower air passages 31 and 32, and to this end a conduit 35 is provided near the discharge end of the tunnel through which air is removed from the lower passage 32 through an opening 36 formed in the side wall thereof. The upper end of the conduit 35 leads to a suction fan 37 which may be driven by an electric motor 38 mounted upon the top of the cooling tunnel, and the air discharged from the fan 37 passes through the conduit 39 which directs air into the upper passage 31 through the upper wall of the tunnel. Air is removed from the upper passage 31 at the material receiving end of the tunnel through the exhaust pipe 40 which may lead to a suction fan 41 driven by the motor 42, and the air upon leaving the fan is forced through the conduit 43 into the lower passage 32 through a side wall thereof, as will be apparent from Fig. 1. As a result of the construction just described the same air is used over and over again in the tunnel and is caused to travel in one direction in one air passage and in the opposite direction in the other air passage. In the construction shown the air in the lower passage travels in the direction of the conveyor apron as indicated by the arrows in Fig. 7 and the air in the upper passage travels in the opposite direction, but this is not essential in all embodiments of the invention since in some cases it may be desirable to drive the air in the upper passage 31 in the direction in which the conveyor apron 13 travels and force the air in the lower passage in the opposite direction.

As above pointed out an important feature of the present invention resides in the construction whereby the refrigerating coils are located below the goods passing through the tunnel rather than above them, as heretofore, and to this end the brine, ammonia or other cooling fluid is supplied to coils mounted in the lower air passage 32 by a pipe 44 which may lead from a refrigeration machine of any well known construction. The cooling fluid supplied by the pipe 44 passes through the upper coils 45 within the air chamber 32 and through the lower coils 46 and may return to the refrigerating machine through the pipe 47. The temperature of the air in the cooling tunnel may be readily controlled by adjusting the valve 48 upon the fluid supply pipe 44 to control the rate of flow of the cooling fluid through the coils within the air chamber 32. The upper group of coils 45 may be supported by transversely extending bars 49 and the lower group of coils may be supported by the transversely extending bars 50. The moisture which condenses out of the air onto the pipes is caught in pans 51 which may rest upon the floor 28 of the tunnel, and deflector plates or small pans 52 may be provided over the transversely extending bars 50 to direct the moisture dropping from the coils at this point into the pans 51.

As a result of the arrangement of the cooling coils just described all danger of moisture dropping from the coils onto the upper run of the apron 13 to injure the same is avoided and the upper air passage 31 is entirely free from obstructing structure. It may therefore be easily inspected and cleaned, and since the air in the cooling chamber is used over and over again it becomes much drier than the air from the atmosphere, as a result of the condensation of moisture onto the cooling coils; this construction therefore serves to supply dry air to the upper air passage 31. By providing blowers at the opposite ends of the cooling tunnel air may be forced lengthwise of the upper and lower air passages 31 and 32 at any desired speed in order to quickly cool the freshly coated confections traveling through the tunnel. Since the upper air passage 31 is free from obstructing structure, less force is required to drive the air through this passage than through the lower air passage 32 containing the cooling coils. It is therefore found that the blower 37 may be driven at a lower speed than the blower 41. The air conduit 35 may be provided with a thermometer 53 for indicating the temperature of the cooling air employed in the tunnel, and one or more windows 54 may be provided in a side wall of the tunnel in order that the passage of the confections through the tunnel may be observed.

The conveyor apron 13 may be formed either of paper or of thin woven fabric, but in either case it is given a glazed or enameled surface to prevent the coated confections from sticking to the same. This apron is therefore light in weight and is easily torn so that it is necessary to handle the same carefully to prevent it from being injured. Another important feature of the present invention therefore resides in an endless sheet metal conveyor belt for supporting and conveying the upper or loaded run of the apron 13 through the cooling chamber. This conveyor belt is formed of sheet metal sections 55 the opposite ends of which are connected to spaced side chains 56. These side chains are positively driven from a power shaft 57 provided with the sprockets 58 about which the side chains 56 pass at the delivery end of the cooling tunnel. The side chains 56 pass around supporting rollers 59 located near the opposite or material receiving end of the cooling chamber, and the tension of the chains 56 may be varied by adjusting the bearing blocks 60 for the central shaft 61 of the drums 59, these blocks being slidably mounted in supporting brackets 62 and may be adjusted by operating the adjusting bolts 63. The upper run of the side chains 56 is supported by the angle irons 64 that may be secured to the uprights 17, and the lower run of the side chains is similarly supported by the angle irons 65. The construction of the sectional belt just described is such that the side chains to which the sheet metal sections 55 are secured are positively driven and are held by the guide bars 64 from working sidewise, and as a result all danger of the conveyor belt slipping or working sidewise is avoided. The sectional metal belt not only operates much more satisfactorily than the canvas conveyor belts employed heretofore, but is a much better conductor and as a result it becomes chilled quickly by the cold air in the tunnel and this serves to quickly cool the lower face of the coated confections to prevent the chocolate at the bottoms of the confections from spreading out or forming "feet."

In order to relieve the lower run of the conveyor apron 13 from injurious dragging forces, another feature of the present invention resides in an endless conveyor which is supported below the cooling tunnel and which serves to support and advance the lower run of the apron 13. This conveyor in the embodiment of the invention shown consists of the spaced side chains 66 to which the transversely extending bars 67 are secured. The endless chains 66 may be driven from a power shaft 68 located near the material receiving end of the tunnel and upon which are mounted the chain engaging sprockets 69. The tension of the chains 66 may be adjusted by the adjusting means shown in Fig. 4 for moving the sprockets 70 located near the opposite end of the tunnel in a direction to vary the tension of the chains. The lower run of the apron 13 rests upon the upper transversely extending bars 67 and these bars are advanced by the side chains 66 at the speed of the apron 13, or if desired at a slightly faster speed. This construction not only supports the lower run of the apron 13 and relieves the same from undue tension, but serves also to help drive the endless apron, which is important because the apron is light in weight and is difficult to drive, due to the fact that it cannot be stretched tight and presents very little friction to the driving means.

The power shaft 57 for the sheet metal belt may be driven in timed relation with the conveyor apron 11 from the driving mechanism of the chocolate coating machine 10, and this is accomplished by providing the longitudinally extending driving rods 71 and 72 which extend lengthwise of the entire tunnel beneath the same and the driving rod 72 is provided at its right-hand end viewing Fig. 4 with a worm 73 which meshes with a worm gear 74 and the latter serves to drive the power shaft 57 by means of the chain 75. The driving gears are preferably enclosed in a protecting casing 76 as shown and the operating parts are supported by the uprights 77 located some distance from the discharge end of the tunnel, as will be apparent from Fig. 4. The arrangement is such that the conveyor apron 13 upon leaving the tunnel travels along the packing table 78 where girls may be engaged in removing the confections 34 from the traveling apron 13 and packing them in boxes. The power shaft 68 for the conveying mechanism that supports the lower run of the apron 13 may be driven by a chain 79 (see Fig. 3) which is operated from the driving rod 71.

In order to further facilitate the drive of the endless apron 13 the spaced driving rollers 80 are provided below the packing table 78 and the arrangement is such that the apron passes downwardly between these spaced rollers to form a loop, as best shown in Fig 5, and in which loop a roller 81 is floatingly supported. The feeding rollers 80 may be driven from the worm gear 74 by the sprocket chains 82 and 83. The particles of chocolate which may adhere to the upper face of the conveyor apron 13 will tend to stick to the drive rollers 80 and the scrapers 84 are therefore provided to scrape these rollers in order to keep them clean. The adjusting screws 84ª are provided to adjust the scrapers 84 towards and from the rollers with which they cooperate. The chocolate removed from the rollers by the scrapers 84 falls into the pan 85.

It is necessary to hold the portion of the conveyor apron 13 which passes around the knife blade 12 taut, in order that the coated confections will pass smoothly from the conveyor apron 11 to the apron 13. In accordance with the present invention the desired tension is maintained upon that portion of the apron 13 which passes around the knife blade 12 by providing the floating roller 86 the opposite ends of which are guided for vertical movement by the spaced guides 87 and the roller 86 is provided near its opposite ends with the guiding disks 88 which engage the opposite marginal edges of the apron 13 and prevent the same from working sidewise. The conveyor apron 13 upon leaving the supporting and advancing bars 67 near the material receiving end of the tunnel may pass over a roller 89 located near the partition 15 and over a second guide roller 90 located near the floating roller 86. The knife blade 12 may be adjusted towards and from the delivery end of the apron 11 by attaching the ends of the knife blade to the supporting brackets 91 which are mounted upon the table 14 for adjustment in the direction of their length through the operation of the adjusting screws 92.

It is found that the use of the traveling belts or conveyors 55 and 67 which are constructed so that they cannot slip or work sidewise, greatly reduces the tendency of the paper apron 13 to work sidewise and tear. The weight of the confections serves to hold the upper run of the apron 13 in contact with the conveyor belt 55 and the conveyor bars 67 for the lower run of the apron may be provided with the disks 93 that engage the side edges of the apron and hold it against lateral displacement.

The tendency of the air traveling lengthwise of the upper air passage 31 to escape from the discharge end of the tunnel beneath the gate 33 may be reduced by providing the adjustable deflector plate 94 within the air passage and which is constructed to direct the air upwardly into the discharge conduit 40. This plate may be adjusted toward and from the apron 13 by operating the adjusting bolt 95. The water that collects in the drip pans 51 is carried off through the drain pipe 96.

Through the use of the air cooling system herein described the confections can be cooled much more rapidly than in the tunnels employed heretofore, and all danger of moisture dropping on the conveyor apron from the refrigerating coils is avoided. Furthermore, through the use of the traveling conveyors for the upper and lower runs of the apron 13 the wear and strain upon the apron is reduced and the tendency of the same to run crooked is eliminated, with the result that a paper apron will last much longer in the present construction than in the cooling tunnels in which it has been employed heretofore.

What is claimed is:—

1. A cooling tunnel for cooling confections, comprising in combination, an elongated casing which is closed to the atmosphere and provided with a lower air passage and an upper air passage, means for advancing confections through the casing, blowers arranged near the opposite ends of the tunnel externally of the casing, air conduits between said air passages and blowers for forcing air from one passage to the other and arranged to introduce air into the upper passage and remove it therefrom through the top of the casing, and means for cooling the circulating air.

2. A cooling tunnel for cooling confections, comprising in combination, an elongated casing that is closed to the atmosphere and having a lower air passage and an upper air passage, means for conveying confections through the casing, a conduit at one end of the casing and provided with a blower for removing the air from the lower passage through a side wall and directing it into the upper passage through the top of the casing, a conduit at the opposite end of the casing and provided with a blower for conducting air from the upper passage through the top of the casing and directing it into the lower passage through a side wall thereof, and means for cooling the circulating air.

3. A cooling tunnel for cooling confections, comprising in combination, an elongated casing, a metal belt for conveying confections through the casing and having its upper run supported to form a traveling partition that divides the casing into an upper and lower air passage, means in the lower passage for cooling the air therein, blowers positioned near the ends of the tunnel externally of the casing, and air conduits between said air passages and blowers for forcing air from one passage to the other so that the air in the upper passage is directed against the confections while the air in the lower passage contacts directly with the metal belt to chill the same and the bottoms of the confections carried by the belt.

4. A cooling tunnel for cooling confections, comprising in combination, an elongated casing, a metal belt for conveying confections through the casing and having its upper run supported to form a traveling partition that divides the casing into an upper and lower air passage, means for cooling the air used in the tunnel, blowers positioned near the ends of the tunnel externally of the casing, and air conduits between said air passages and blowers for forcing cold air in one direction through the upper passage and in the opposite direction through the lower passage so that the air in the upper passage is directed against the confections and the air in the lower passage contacts directly with the metal belt to chill the same and the bottoms of the confections carried by the belt.

In testimony whereof, we have signed our names to this specification.

JESSE W. GREER.
FREDERICK W. GREER.